United States Patent
Jones et al.

(10) Patent No.: US 6,347,954 B1
(45) Date of Patent: Feb. 19, 2002

(54) OPTICAL TRANSCEIVER MODULE

(75) Inventors: Dennis B. Jones, Orange; Jenq-Yih Hwang; Eddy Wong, both of Irvine, all of CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/626,524

(22) Filed: Jul. 27, 2000

(51) Int. Cl.[7] ...................... H01R 13/627; H01R 13/44
(52) U.S. Cl. .................... 439/358; 439/354; 439/138
(58) Field of Search ........................ 439/76.1, 607, 439/357, 358, 138, 354; 385/92

(56) References Cited

U.S. PATENT DOCUMENTS

| | | | |
|---|---|---|---|
| 3,993,390 A | * 11/1976 | Eigenbrode | 439/358 |
| 5,564,933 A | * 10/1996 | Bouchan et al. | 439/76.1 |
| 5,879,173 A | * 3/1999 | Poplawnski et al. | 438/138 |
| 5,966,487 A | 10/1999 | Gilliland | |
| 6,178,096 B1 | 1/2001 | Flickinger | |

* cited by examiner

Primary Examiner—Brian Sircus
Assistant Examiner—Chandrika Prasad
(74) Attorney, Agent, or Firm—Wei Te Chung

(57) ABSTRACT

An optical transceiver module comprises a base having a bottom plate and two side walls extending upward from the bottom plate, each side wall having a reception socket formed therein. A latch is resiliently and removably fixed to the reception socket and includes a deformable portion extending out of the reception socket. An interconnection bracket : positioned in the base, removable in vertical direction and fixed in horizontal direction with respect to the base. Two diodes are fixed in the interconnection bracket. A circuit board is fixed to the interconnection bracket and solder to the diodes.

18 Claims, 7 Drawing Sheets

OPTICAL TRANSCEIVER MODULE

CROSS REFERENCES:

This application is copending with the U.S. patent applications with an unknown serial numbers filed on the same date with the invention and titled "AN INTERCONNECTION BRACKET USED IN AN OPTICAL TRANSCEIVER MODULE", "A REVERTIBLE SHIELDING DOOR USED IN AN OPTICAL TRANSCEIVER MODULE AND THE OPTICAL TRANSCEIVER MODULE USING THE SAME", and "OPTICAL TRANSCEIVER HOUSING HAVING RESILIENT LATCHES OPTIONALLY ATTACHED THERETO" all of which have one common inventor and the same assignee with the invention.

BACKGROUND OF THE INVENTION

1. Field of The Invention

The present invention relates to an optical transceiver module, particularly to one which is installed with resilient latches for detachably fixing to receptacle, with interconnection bracket for fixing diodes therein, and with shielding door for eye protecting when a mating plug is withdrawn from the module.

2. The Prior Art

Optical transceiver modules have been used for bi-directional transmission of data between an electrical interface and an optical data link. The optical transceiver module receives electrically encoded data signals which are converted into optical signals and transmitted over the optical data link. Likewise, the module receives optically encoded data signals which are converted into electrical signals and transmitted onto the electrical interface. The module may be inserted into memory card assembly fixed in a backplane of a n exchange system or a huge server. U.S. Pat. No. 3,611,752 has disclosed a removable optical transceiver module having a main housing which consists of a potting box with potting material inserted therein. In addition, a circuit board is encased by the potting material. The circuit board has a photo diode and a laser diode soldered thereon. The diodes extend outside of the potting box through a recess. A recess cover is provided for forming a liquid tight seal between the recess cover, the potting box, and the diodes. Two releasable latches are integrally molded with the transceiver housing at two sides thereof. The module housing may be pluggable via the releasable latches having detents received in apertures of a receptacle. The module may be withdrawn from the receptacle by pressing the releasable latches and simultaneously pulling the module out of the receptacle. However, the releasable latch is apt to be broken at the interconnection point to the housing for several times of insertion/withdrawal. Moreover, some of the transceivers do not need the releasable latches due to its specific configuration to the card assembly. Therefore, it is requisite to provide a separate releasable latch which may be optionally configured to the transceiver housing so that the transceiver housing can be used for either a first configuration needing the latches or an alternative configuration not needing the latches.

It is known that the positioning and installation of the photo diode and the laser diode to the module is important. U.S. Pat. No. 5,611,752 discloses an optical transceiver module having a potting box with potting material inserted therein. A printed circuit board is encased by the potting material. The printed circuit board has a photo diode and a laser diode soldered thereon before it is installed in the potting box. The photo diode and the laser diode extend outside of the potting box through a recess. A recess cover is provided for forming a liquid tight seal between the recess cover, the potting box, and the photo and laser diodes. With this structure, the photo and laser diodes need to be soldered on the printed circuit board first and then they are together installed inside the potting box. However, additional jigs or the like are required for aiding the diodes to be soldered to the printed circuit board before they are installed in the transceiver module. It is requisite to provide an interconnection bracket which is part of the transceiver module for simultaneously fixing the diodes and the printed circuit board in position before the diodes are soldered to the printed circuit board.

It is also known that the photo signal emitted from the laser diode is harmful to human eyes. Therefore, in U.S. Pat. No. 5,879,173, a shielding door is provided in an entry of a receptacle which receives the optical transceiver. A spring such as a torsion spring is additionally mounted on a pivotable post of the shielding door for returning the shielding door to its closed position parallel to the front face of the receptacle's entry. However, the spring is apt to escape from its constant position due to the frequent open/close of the shielding door. Therefore, it is requisite to provide a new shielding door having a self-resilient structure without the need of an extra spring.

SUMMARY OF THE INVENTION

The primary purpose of the present invention is to provide a new optical transceiver module detachably engaged with an external receptacle and capable of retaining diodes and a printed circuit board before soldering without the aid of zigs or the like.

Another purpose of the present invention is to provide a new optical transceiver module for detachably engaging with an external receptacle and preventing users from being hurt by radiation light emitted from the module.

Further another purpose of the present invention is to provide a new optical transceiver module having a bracket for retaining diodes and a printed circuit board and having a revertible shielding door for eye protection.

According to a first aspect of the present invention there is provided an optical transceiver module comprising a base having a bottom plate and two side walls extending upward from the bottom plate, each side wall having a reception socket formed therein. A latch is resiliently and removably fixed to the reception socket and includes a deformable portion extending out of the reception socket. An interconnection bracket is positioned in the base, removable in vertical direction and fixed in horizontal direction with respect to the base. Two diodes and a circuit board are fixed to the interconnection bracket before the diodes are soldered to the circuit board.

According to a second aspect of the present invention there is provided an optical transceiver module comprising a base having a bottom plate and two side walls extending upward from the bottom plate, each side wall having a reception socket formed therein. A latch is resiliently and removably fixed to the reception socket and having a deformable portion extending out of the reception socket. A revertible shielding door is pivotably positioned in a front face of the base and remain perpendicular to the bottom plate. A spring arm extends from one end of the revertible shielding door and is fixed to an intermediate portion of the base, so that when the revertible door is pivotably moved with respect to the front face of the base, the spring arm is deformed and preserves a recovering tension therein.

According to a third aspect of the present invention there is provided an optical transceiver module comprising a base having a bottom plate and two side walls extending upward from the bottom plate. An interconnection bracket is positioned in a front portion of the base and slidably retained between the side walls. Two diodes are fixed in the interconnection bracket. A circuit board is fixed to the interconnection bracket and soldered to the diodes. A revertible shielding door is pivotably positioned in a front face of the base and remain perpendicular to the bottom plate. A resilient arm extends from one end of the revertible shielding door and it is fixed to an intermediate portion of the base. When the revertible door is pivoted to be no more perpendicular to the bottom plate, the spring arm is deformed and preserves a recovering tension therein.

DETAILED DESCRIPTION OF THE PREFERRED EMBODIMENT

Figure 1:
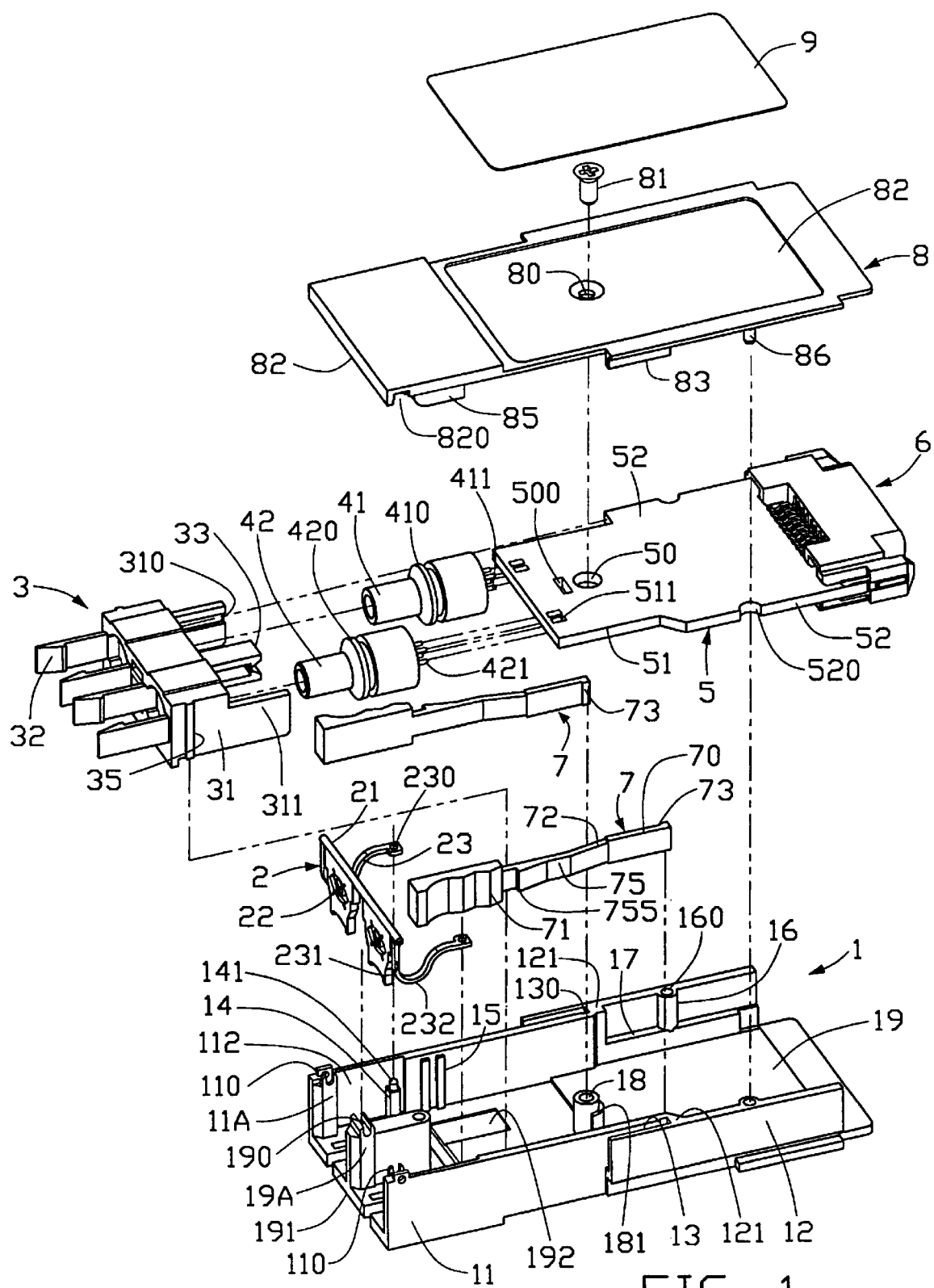
FIG. 1 is an exploded view of a transceiver module in accordance with the present invention.
Figure 2:
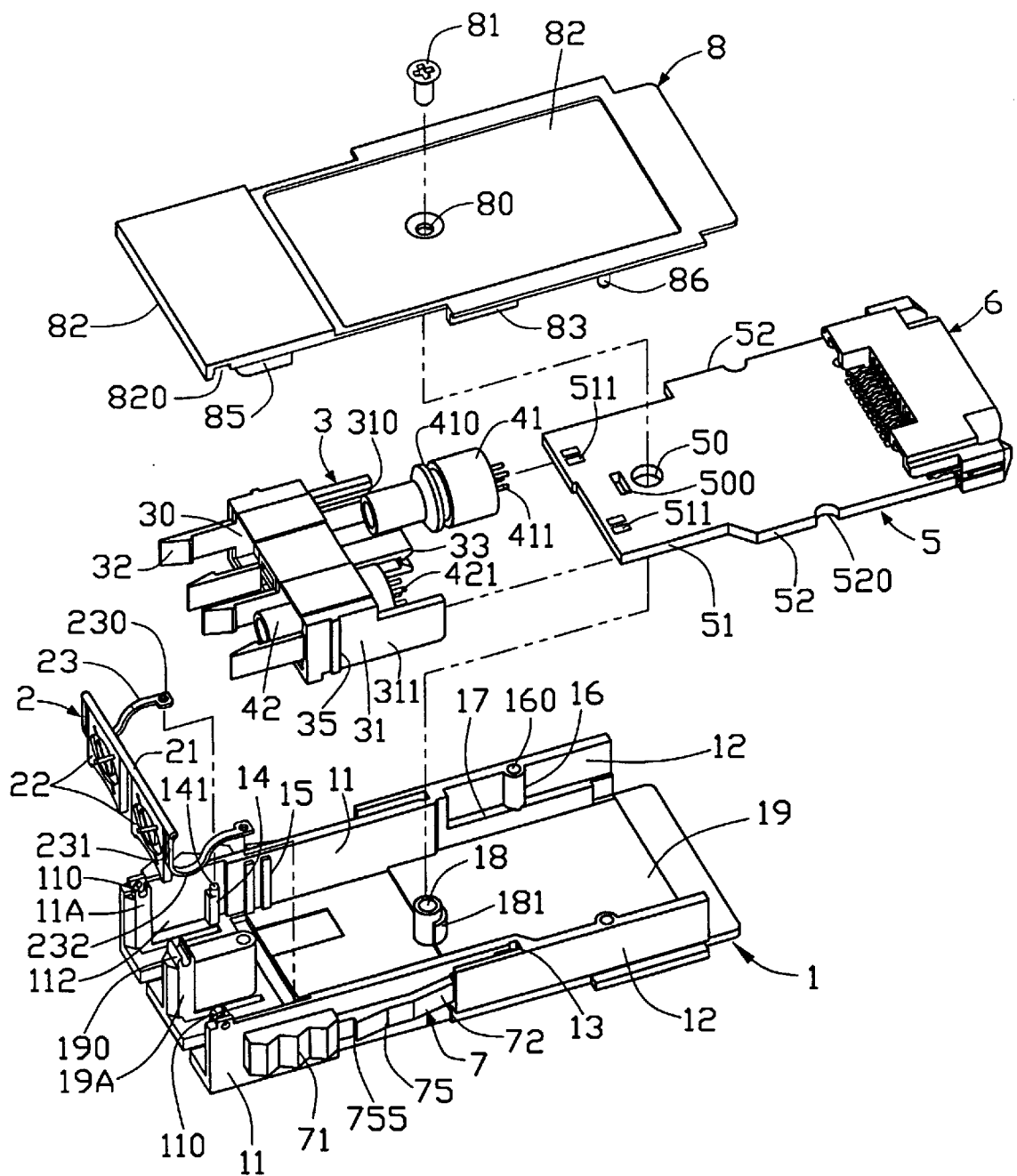
FIG. 2 is a similar view to FIG. 1 except that some of the parts have been assembled.

Referring to FIGS. 1 and 2, an optical transceiver in accordance with the present invention comprises a base 1, a shielding door 2 pivotally and resiliently fixed to the base 1, an interconnection bracket 3 detachably fixed to the base 1, a printed circuit board 5 fixed to the interconnection bracket 3 and firmly positioned in the base 1, a pair of resilient latches 7 fixed to two opposite sides of the base 1, and a cover 8 detachably mounted on the base 1.

The base 1 has a bottom plate 19, a pair of front side walls 11 and a pair of rear side walls 12 extending from two sides of the bottom plate 19, and each front side wall 11 and rear side wall 12 formed at the same side are connected to each other via an interconnection wall 121.

A reception socket 13 is formed by overlapped and spaced-apart sections of the front side wall 11 and the rear side wall 12, so that the reception socket 13 exposes to exterior from its top and front faces. A cutout 130 is defined in the reception socket 13. Specifically, the cutout 130 is formed at the outer periphery of the front side wall 11 around the interconnection wall 121.

Two stands 14 extend upward from the bottom plate 19 and are respectively integrated with inner surfaces of the front side walls 11. Each stand 14 has a positioning post 141 extends upward therefrom. A pair of positioning ribs 15 is formed on an inner surface of each front side wall 11, wherein the ribs 15 are parallel to each other. Therefore, there are opposite pairs of positioning ribs 15 formed on the front side walls 11, yet only one pair is shown in the drawing.

A boss 16 is formed on an inner surface of the rear side wall 12 and a vertical hole 160 is defined in the boss 16. A positioning step 17 is formed below the boss 16. A hollow post 18 extends upward from the bottom plate 19 and a peripheral seat 181 is formed at a periphery portion of the hollow post 18. A front central support 19A is formed on the bottom plate 19 near a front edge 191 thereof. Two front side supports 11A are formed on the bottom plate 19 and respectively integrated with inner surface of each front side wall 11. Pivot holes 190, 110 are respectively formed in the front central support 19A and the front side supports 11A, and the pivot holes 190, 110 are co-linear. A positioning space 112 is defined between each pair of the front side support 11A and the stand 14 which are integrated with the same front side wall 11. Two shallow recesses 192 (only one is shown) are formed in the bottom plate 19 substantially between the opposite pairs of the positioning ribs 15.

The shielding door 2 comprises a pivot 21 pivotably positioned in the in-line holes 110, 190 of the front side supports 11A and front central support 19A. Two shielding plates 22 extending from the pivot 21 are coplanar with each other. Two spring arms 23 extend from near two ends of the pivot 21. Each spring arm 23 has a vertical section 231 coplanar with the shielding plate 22 and a curved section 232 integrated with the vertical section 231 and extending away from the vertical section 231 horizontally for an offset distance. A hole 230 is defined at a terminated end of the curved section 232. The spring arm 23 is fixed to the stand 14 by engaging the hole 230 thereof with the positioning post 141.

Figure 4A:
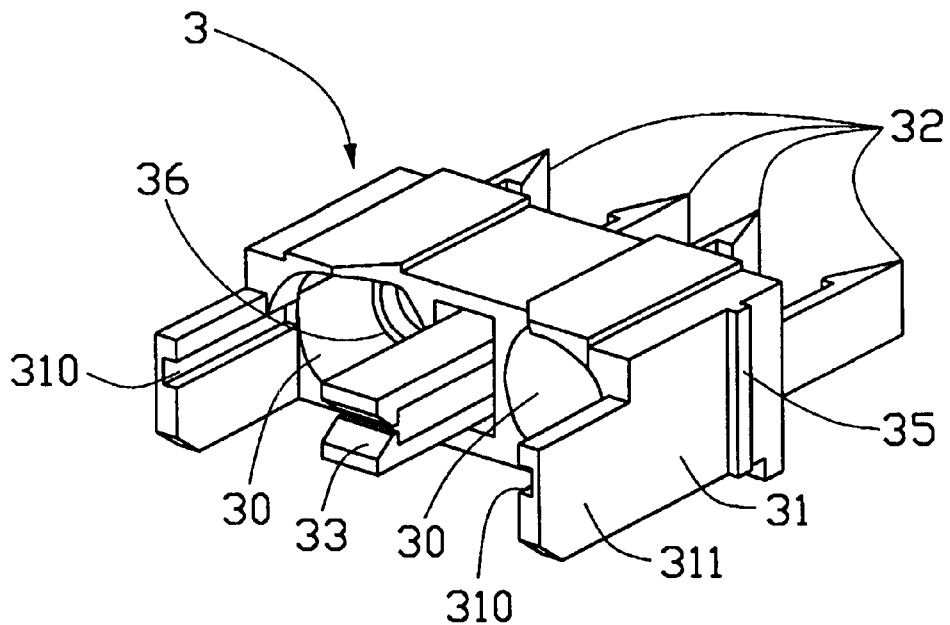
FIG. 4A is an enlarged view of the interconnection bracket of FIG. 1.

Also referring to FIG. 4A, the interconnection bracket 3 comprises a housing 31 defining two cavities 30 therein for receiving a photo diode 41 and a laser diode 42. Each cavity 30 has a shoulder 36 functioning as a stopper when the corresponding diode 41 or 42 are inserted into the cavity 30. The photo diode 41 and the laser diode 42 have similar outlook each having a circular groove 410, 420 defined in the periphery thereof and each having conductive leads 411, 421 extending from a rear face thereof. The housing 31 has two pairs of spring hooks 32 extending from a front face thereof and two rear plates 311 extending from a rear face thereof. Each rear plate 311 defines a channel 310 in an inner surface thereof. A pair of retention hooks 33 proximate to each other extends from a rear face of the housing 31. Ribs 35 are formed in opposite sides of the housing 31 for simultaneously engaging with opposite pairs of the positioning ribs 15 formed in the front side walls 11 of the base 1 when the interconnection bracket 3 is fixed to the base 1.

Figure 4B:
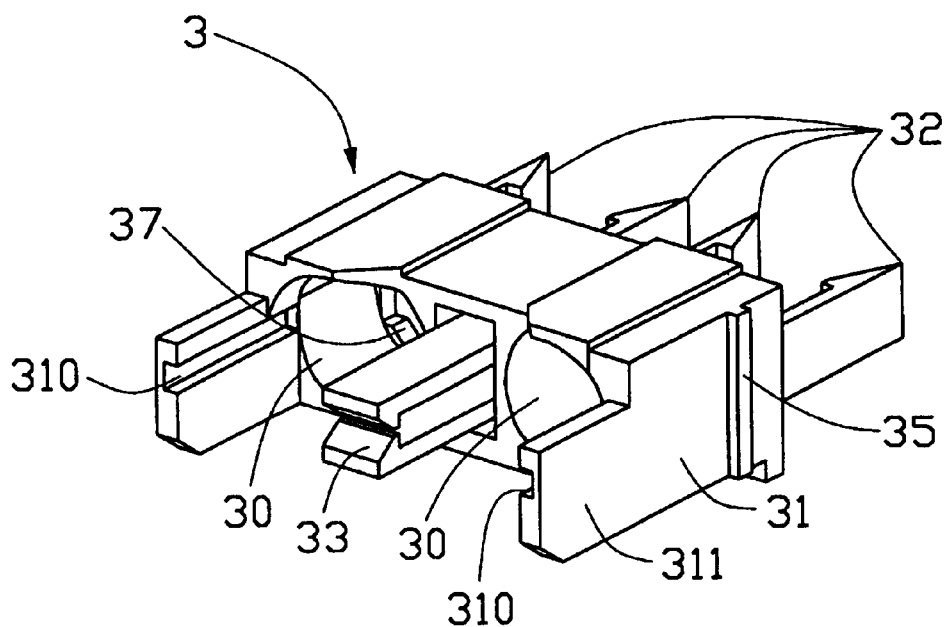
FIG. 4B is an alternative embodiment of the interconnection bracket.

Referring to FIG. 4B, an alternative embodiment of the interconnection bracket 3 is shown, wherein most of the structure of the alternative embodiment is identical to that of the embodiment shown in FIG. 4A except that each cavity has two retention ribs 37 formed in a same virtual plane for rotatably engaging with the circular groove 410 (420) of the photo diode 41 (or laser diode 42). With the additional retention ribs 37, the diodes 41, 42 can be further retained in the cavities 30 of the interconnection bracket 3.

Figure 4C:
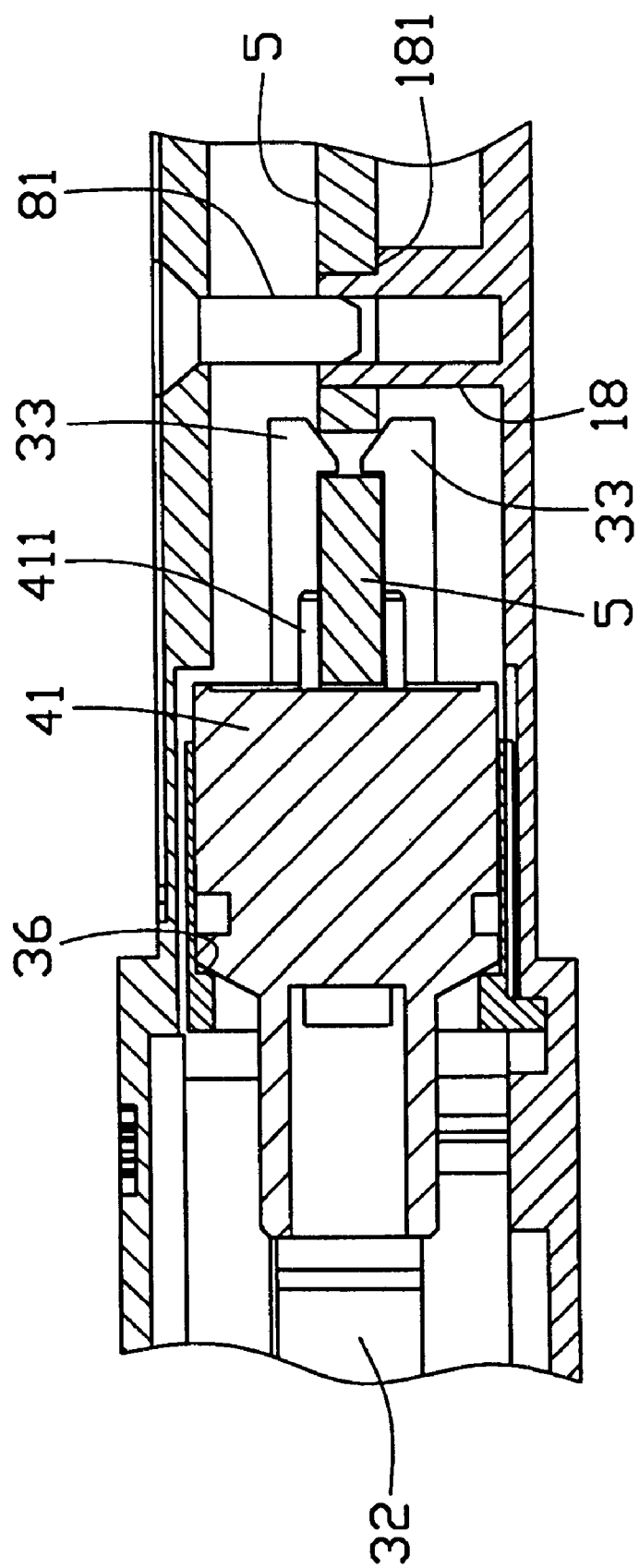
FIG. 4C is a schematic cross-sectional view of the assembled transceiver module of FIG. 1.
Figure 5:
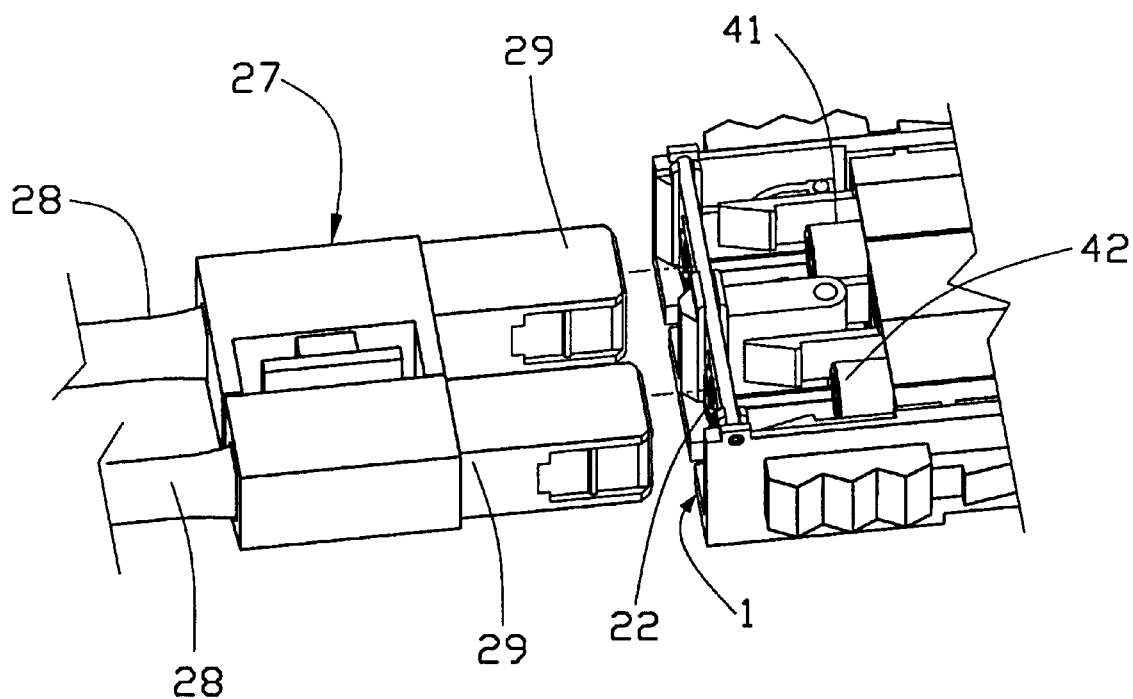
FIG. 5 is a partially perspective view of the transceiver module and a complementary fiber connector to be plugged into the transceiver.
Figure 6:
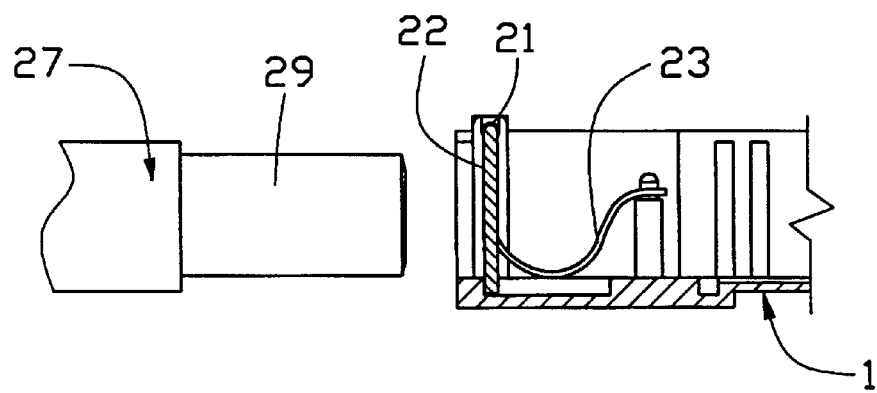
FIG. 6 is a schematic view of FIG. 5 showing the relation between a shielding plate and a spring arm before the complementary fiber connector has been plugged into the transceiver.

The printed circuit board 5 comprises a front narrow section 51 and a rear wide section 52 along a length wise direction thereof. Solder pads 511 are formed on the printed circuit board 5 near a front edge thereof for soldering with the conductive leads 411, 421 of the photo diode 41 and the laser diode 42. A slit 500 is defined in the front narrow section 51 for engaging with the pair of retention hooks 33 when the front edge of the printed circuit board 5 is moved into between the retention hooks 33. A fixing hole 50 is defined in the front narrow section 51 for retaining around the hollow post 18, with the periphery thereof being seated on the peripheral seat 181 around the hollow post 18 as shown in FIG. 4C. Two semi-circular cutouts 520 are defined in opposite sides of the rear wide section 52 for mating with peripheries of the bosses 16 of the base 1. A rear connector 6 such as an SCA2 connector is connected to a rear edge of the printed circuit board 5 by straddle mounting soldering.

The resilient latch 7 has a retention section 70 having a hook end 73 for being engaged with the cutout 130 of the reception socket 13 when the retention section 70 is inserted into the socket 13 of the base 1. A bent-out section 72 is integrated with the retention section 70, yet not in alignment with the former but bent out for a predetermined angle for creating a horizontal offset with respect to the retention section 70. An engagement section 75 is integrated with the bent-out section and parallel to the retention section 70. The engagement section 75 has a ratchet 755 for engaging with a slot of an external guide rail or receptacle (not shown) which removably receives the optical transceiver module therein. A handle section 71 is integrated with the engagement section 75 and has teeth formed thereon for increasing friction when a user operates thereon.

The cover 8 is a metal plate having a shallow groove 88 defined in most area thereof, a hole 80 defined in the shallow groove 88 for being connected to the hollow post 18 of the base 1 via a screw 81 as shown in FIG. 4C. A cap 82 is formed at a front edge of the cover 8 for being located on aligned front top surfaces of the front side supports 11A and the front central support 19A. A reception groove 820 is defined beside the cap 82 for covering the pivot 21 of the shielding door 2 while allowing the pivot 21 to rotate therein. A pair of posts 86 (only one is shown) extends downward from opposite sides of the cover 8 for being inserted into the vertical holes 160 of the bosses 16 when the cover 8 is mounted on the base 1. A pair of middle flanges 83 (only one is shown) extends downward from opposite sides of the cover 8 for being retained in the sockets 13 when the cover 8 is mounted on the base 1. A pair of front flanges 85 (only one is shown) extends downward from opposite sides of the cover 8 for being retained in the positioning space 112 of the base 1 when the cover 8 is mounted on the base 1. A tape 9 is attached on the surface of the shallow groove 88 after the cover 8 has been firmly mounted on the base 1.

Figure 3:
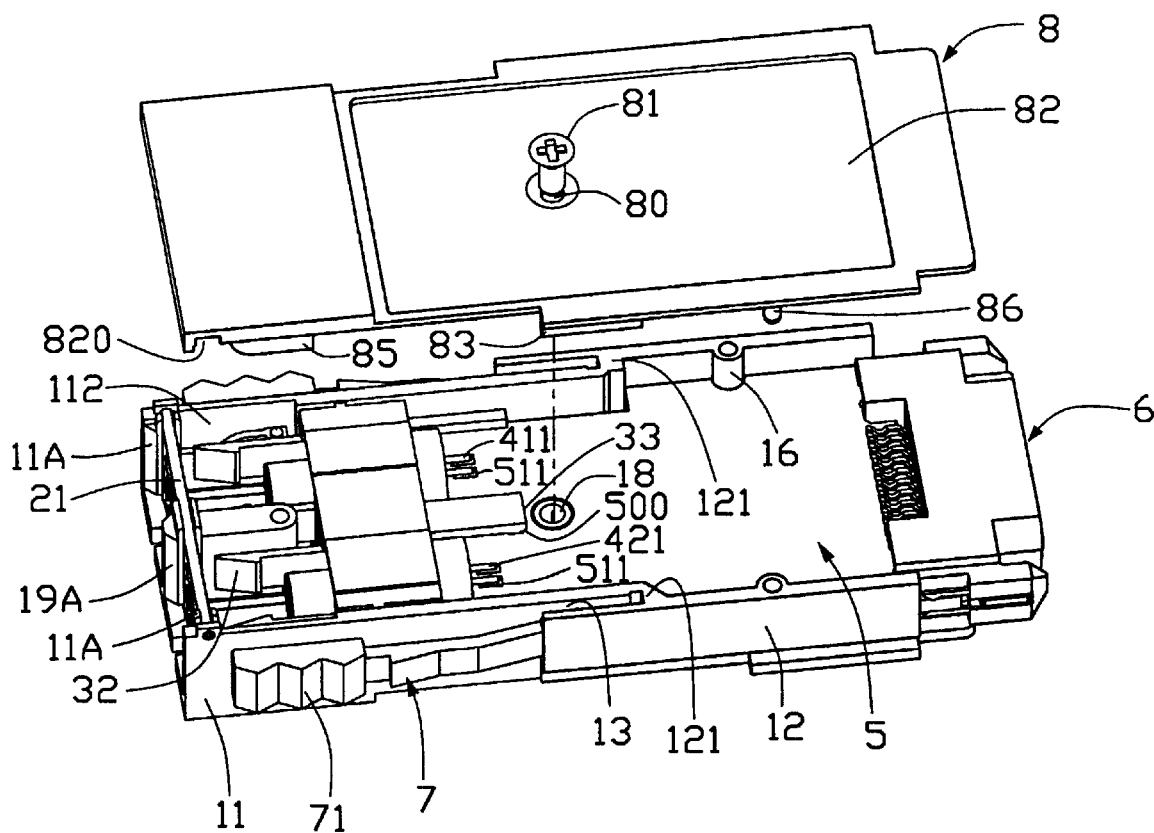
FIG. 3 is a partially assembled view of FIG. 1.

In assembling, the photo diode 41 and the laser diode 42 are firstly fixed in the interconnection bracket 3 by inserting the photo diode 41 and the laser diode 42 into the cavities 30 of the interconnection bracket 3, appropriately rotating the diodes 41, 42 until the conductive leads 411, 421 are oriented in a ready-to-solder position with respect to the printed circuit board 5. For the alternative embodiment of the interconnection bracket 3 shown in FIG. 4B, the first assembling step is similar except that the diodes 41, 42 have to be inserted into the cavities 30 by additional force for fixing the ribs 37 in the circular grooves 410, 420 of the diodes 41, 42 so that the circular grooves 410, 420 can rotatably engage with the retention ribs 37. Secondly, the printed circuit board 5 is moved forward to the interconnection bracket 3 so that the slit 500 can be engaged with the retention hooks 33 and the conductive leads 411, 421 can be in contact with the solder pads 511. Thirdly, perform a soldering procedure in a bake for soldering the conductive leads 411, 421 to the solder pads 511. Fourthly, put the printed circuit board 5 and the interconnection bracket 3 down into the base 1 in position, with the rib 35 of the interconnection bracket 3 being retained in the pair of ribs 15, a lower periphery of each diode 41, 42 being seated in the shallow recess 192, the fixing hole 50 being engaged with the hollow post 18, the semi-circular cutout 520 engaging with the boss 16, and the rear wide section 52 being seated on the positioning steps 17. Fifthly, install the shielding door 2 in the base 1 by putting the pivot 21 in the pivot holes 110, 190 and engaging the hole 230 of the spring arm 23 with the positioning post 141. Sixthly, inserting the retention section 70 of the resilient latch 7 into the reception socket 13 of the base 1, with the hook end 73 of the resilient latch 7 being engaged with the cutout 130 formed in the reception socket 13. The configuration after the above six steps can be referred to FIG. 3. Finally, in a seventh step, the cover 8 is mounted on the base 1, with the hole 80 thereof being firmly secured to the hollow post 18 via the screw 81, the post 86 being retained in the vertical hole 160 of the boss 16, the middle flange 83 being positioned in the reception socket 13 and in contact with the retention section 70 of the resilient latch 7, and the front flange 85 being retained in the positioning space 112.

Figure 7:
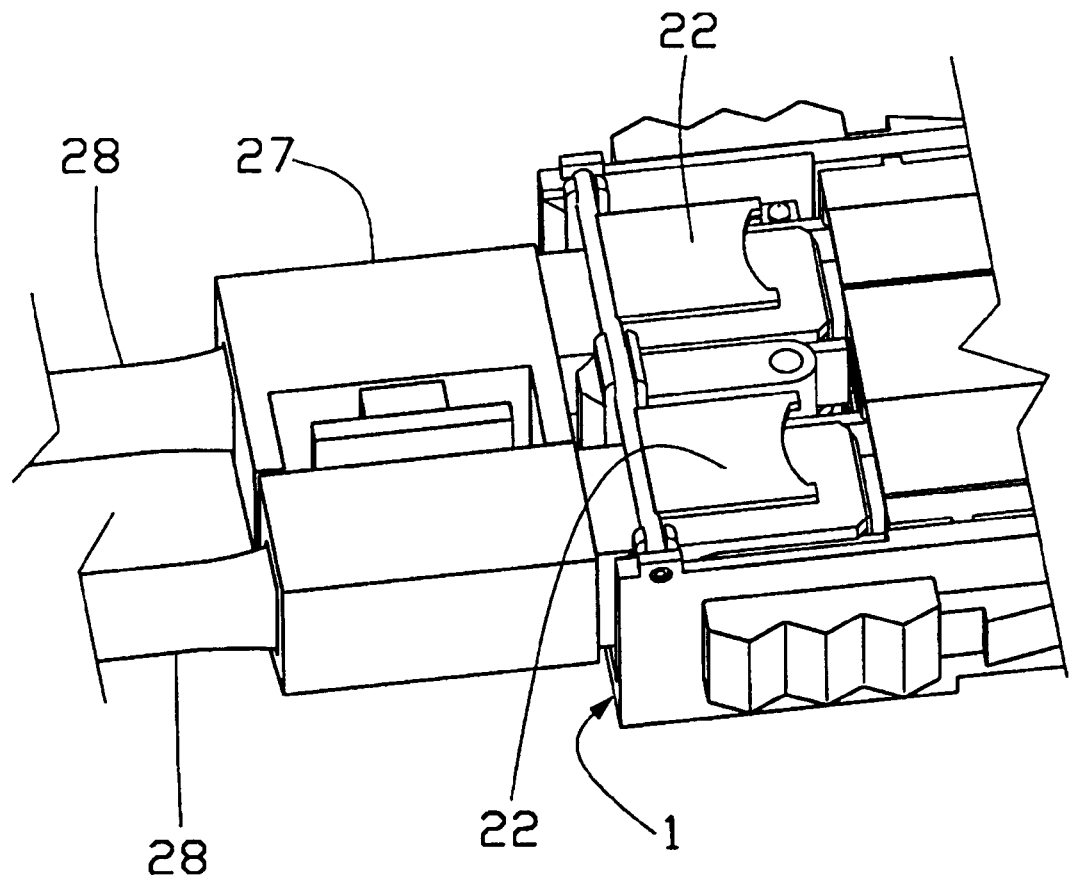
FIG. 7 is an assembled view between the transceiver and the complementary fiber connector of FIG. 5.
Figure 8:
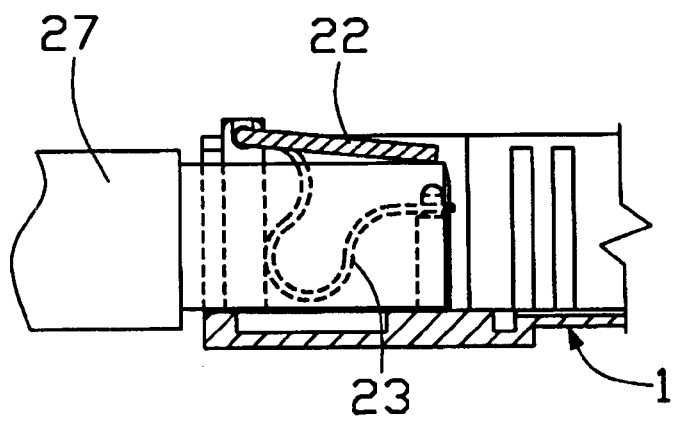
FIG. 8 is a schematic view of FIG. 7 showing the relation between the shielding plate and the spring arm after the complementary fiber connector has been fully plugged into the transceiver.

The activity and function of the shielding door 2 may be referred to FIGS. 5 to 8. Firstly, referring to FIGS. 5 and 6, a fiber connector 27 connected with two fiber cables 28 and having two plugs 29 is ready for insertion into the optical transceiver. Before the plugs 29 are inserted into the optical transceiver module, the shielding plate 22 is maintained vertical to the base 1 and the spring arm 23 remains in its original shape. After the plugs 29 are inserted into the optical transceiver, the pivot 21 is forced to rotate for substantially ninety degrees causing the shielding plate 22 to remain parallel to the base 1, meanwhile the spring arm 23 is deformed and reserves tension therein, as shown in FIG. 7 and 8. When the fiber connector 27 is withdrawn from the optical transceiver, the spring arms 23 recover to their normal form forcing the pivot 21 to rotate for ninety degrees and causes the shielding plates 22 to recover vertical to the base 1.

While the present invention has been described with reference to a specific embodiment, the description is illustrative of the invention and is not to be construed as limiting the invention. Therefore, various modifications to the present invention can be made to the preferred embodiment by those skilled in the art without departing from the true spirit and scope of the invention as defined by the appended claims.

What is claimed is:

1. An optical transceiver module comprising:
    a base having a bottom plate and two side walls extending upward from the bottom plate, each side wall having a reception socket formed therein, wherein each side wall of the base comprises a front, inner side wall and a parallel rear, outer side wall connected to each other via an interconnection wall, and wherein the reception socket is formed by overlapped and spaced-apart sections of the front side wall and the rear side wall;
    a latch being resiliently and removably fixed to the reception socket and having a deformable portion extending out of the reception socket;
    an interconnection bracket made of insulative material and being positioned in the base, removable in vertical direction and fixed in horizontal direction with respect to the base;

two diodes being fixed in the interconnection bracket; and a circuit board being fixed to the interconnection bracket and soldered to the diodes, wherein a pair of retention hooks proximate to each other extends rearward from the interconnection bracket for extending into the circuit board to fix the circuit board therebetween.

2. The optical transceiver module as claimed in claim 1, wherein a cutout is defined inside of the reception socket for engaging with the latch.

3. The optical transceiver module as claimed in claim 2, wherein the cutout is formed at an outer periphery of the front side wall around the interconnection wall.

4. The optical transceiver module as claimed in claim 3, wherein the latch has a hook end for engaging with the cutout of the reception socket.

5. The optical transceiver module as claimed in claim 4, wherein the deformable portion of the latch comprises a bent-out section angled out with respect to the side wall and causing a horizontal offset with respect to the side wall.

6. The optical transceiver module as claimed in claim 5, wherein the deformable portion of the latch has an engagement section integrated with the bent-out section and parallel to the side wall, the engagement section having a ratchet formed thereon for engaging with an external receptacle when the optical transceiver module is inserted into the external receptacle.

7. The optical transceiver module as claimed in claim 6, wherein the deformable portion of the latch has a handle section integrated with the engagement section and having teeth formed thereof for increasing friction.

8. The optical transceiver module as claimed in claim 7, wherein the diodes comprises a photo diode and a laser diode.

9. The optical transceiver module as claimed in claim 1, wherein a rib is formed in one side of the interconnection bracket.

10. The optical transceiver module as claimed in claim 1, wherein two rear plates extending rearward from the interconnection bracket for guiding the diodes to be inserted into the interconnection bracket, and each rear plate defining a channel in an inner surface thereof for guiding and receiving the printed circuit board.

11. The optical transceiver module as claimed in claim 1, wherein the interconnection bracket defines two adjacent cavities for receiving the diodes and each cavity has a retention rib formed therein for preventing the diode from moving in horizontal direction.

12. The optical transceiver module as claimed in claim 11, wherein a pair of spring hooks extending forward from each cavity of the interconnection bracket for cooperating to retain an external plug inserted into the cavity.

13. An optical transceiver module comprising:

a base having a bottom plate and two side walls extending upward from the bottom plate, each side wall having a reception socket formed therein, wherein each side wall of the base comprises a front, inner side wall and a parallel rear, outer side wall connected to each other via an interconnection wall, and wherein the reception socket is formed by overlapped and spaced-apart sections of the front side wall and the rear side wall;

a latch being resiliently and removably fixed to the reception socket and having a deformable portion extending out of the reception socket;

a revertible shielding door being pivotably positioned in a front face of the base and remain perpendicular to the bottom plate, a spring arm extending from one end of the revertible shielding door and fixed to an intermediate portion of the base, so that when the revertible door is pivotably moved with respect to the front face of the base, the spring arm is deformed and preserves a recovering tension therein, wherein the revertible shielding door comprises a pivot pivotably associated with the base, two shielding plates extending from the pivot and coplanar with each other, and wherein the spring arm has a first section coplanar with the shielding plates and a second section extending from the first section and horizontally offset from the first section at a terminated end which is firmly fixed to intermediate portion of the base.

14. The optical transceiver module as claimed in claim 13, wherein the first section of the spring arm is perpendicular to the pivot.

15. The optical transceiver module as claimed in claim 13, wherein the second section of the spring arm is a curved section.

16. The optical transceiver module as claimed in claim 13, wherein the terminated end of the second section of the spring arm defines a hole for engagement with the base.

17. An optical transceiver module comprising:

a base having a bottom plate and two side walls extending upward from the bottom plate;

an interconnection bracket being positioned in a front portion of the base and slidably retained between the side walls;

two diodes being fixed in the interconnection bracket;

a circuit board being fixed to the interconnection bracket and soldered to the diodes; and a revertible shielding door being pivotably positioned in a front face of the base and remain perpendicular to the bottom plate, a resilient arm extending from one end of the revertible shielding door and fixed to an intermediate portion of the base, so that when the revertible door is pivoted to be no more perpendicular to the bottom plate, the spring arm is deformed and preserves a recovering tension therein.

18. The optical transceiver module as claimed in claim 17, wherein the interconnection bracket defines two adjacent cavities for receiving the diodes and each cavity has a rib formed therein for preventing the diode from moving in a horizontal direction.

* * * * *